(12) United States Patent  
Lambert et al.

(10) Patent No.: US 6,975,859 B1  
(45) Date of Patent: Dec. 13, 2005

(54) REMOTE TARGET CONTROL SYSTEM

(75) Inventors: Spencer Lambert, Provo, UT (US); H. Addison Sovine, Provo, UT (US)

(73) Assignee: Action Target, Inc., Provo, UT (US)

( * ) Notice: Subject to any disclaimer, the term of this patent is extended or adjusted under 35 U.S.C. 154(b) by 619 days.

(21) Appl. No.: 10/045,434

(22) Filed: Nov. 7, 2001

Related U.S. Application Data

(60) Provisional application No. 60/246,437, filed on Nov. 7, 2000.

(51) Int. Cl.[7] .......................... H04M 3/00; A63F 13/00; A63B 67/00; F41G 3/26; F41A 33/00
(52) U.S. Cl. ...................... 455/420; 455/419; 463/52; 463/5; 434/22; 434/11; 434/21
(58) Field of Search .............................. 455/74.1, 558, 455/95, 461, 419, 420, 92; 379/93.05, 61, 379/436; 434/21, 16, 19, 11, 17, 20, 22, 12, 434/14, 15; 463/5, 16, 40, 52, 51; 445/420, 445/92; 273/313, 348, 312, 370, 372, 386; 35/25

(56) References Cited

U.S. PATENT DOCUMENTS

| | | | | |
|---|---|---|---|---|
| 4,086,711 A | * | 5/1978 | Gammarino et al. | 434/22 |
| 4,205,847 A | * | 6/1980 | Steiger et al. | 463/5 |
| 4,340,370 A | * | 7/1982 | Marshall et al. | 434/22 |
| 4,395,045 A | * | 7/1983 | Baer | 463/5 |
| 4,844,476 A | * | 7/1989 | Becker | 463/5 |
| 4,898,391 A | * | 2/1990 | Kelly et al. | 463/5 |
| 5,316,479 A | * | 5/1994 | Wong et al. | 434/11 |
| 5,641,288 A | * | 6/1997 | Zaenglein, Jr. | 434/21 |
| 5,649,706 A | * | 7/1997 | Treat, Jr. et al. | 273/358 |
| 5,802,460 A | * | 9/1998 | Parvulescu et al. | 455/92 |
| 5,963,624 A | * | 10/1999 | Pope | 379/110.01 |
| 5,988,645 A | * | 11/1999 | Downing | 273/348 |
| 6,109,614 A | * | 8/2000 | Ciarcia | 273/372 |
| 6,223,029 B1 | * | 4/2001 | Stenman et al. | 455/420 |
| 6,230,214 B1 | * | 5/2001 | Liukkonen et al. | 710/1 |
| 6,283,756 B1 | * | 9/2001 | Danckwerth et al. | 434/11 |
| 6,289,213 B1 | * | 9/2001 | Flint et al. | 455/420 |
| 6,308,062 B1 | * | 10/2001 | Chien et al. | 455/420 |
| 6,322,444 B1 | * | 11/2001 | Matsui et al. | 463/7 |
| 6,328,651 B1 | * | 12/2001 | Lebensfeld et al. | 463/52 |
| 6,463,299 B1 | * | 10/2002 | Macor | 455/556.1 |
| 6,728,546 B1 | * | 4/2004 | Peterson et al. | 455/462 |

FOREIGN PATENT DOCUMENTS

| CA | 2100631 | * | 2/1994 | G06F 012/14 |
|---|---|---|---|---|

* cited by examiner

*Primary Examiner*—William Trost  
*Assistant Examiner*—Kiet Doan  
(74) *Attorney, Agent, or Firm*—Bateman IP Law Group

(57) ABSTRACT

A remote target control system utilizes a telephone as an input device to enable remote control of targets. Preferably, the telephone is in the form of a cordless handset and a base unit so that the user can activate the remote control system from a substantial distance from the base unit of the telephone.

22 Claims, 2 Drawing Sheets

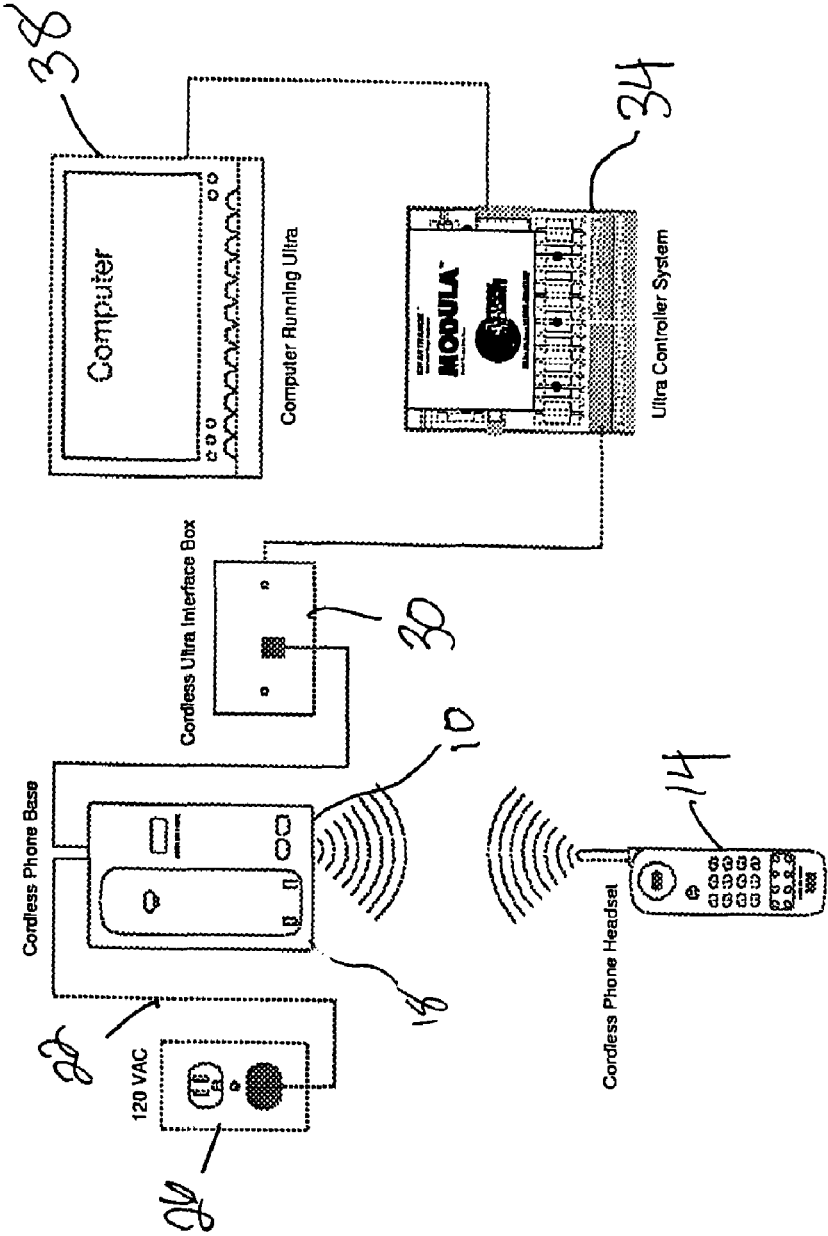

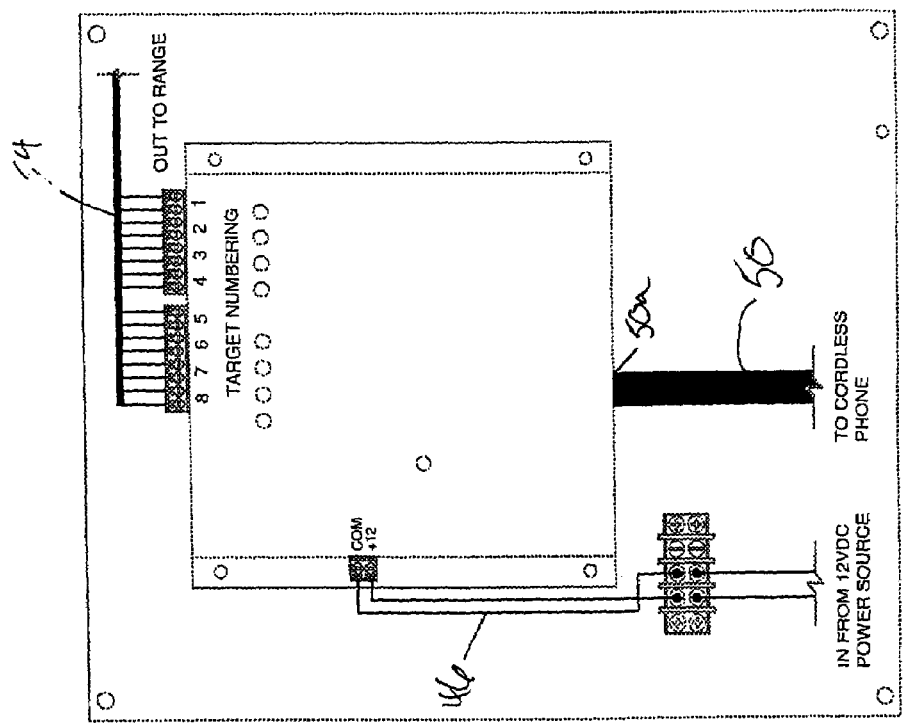

REMOTE TARGET CONTROL SYSTEM

This application claims the benefit of provisional application 60/246,437, filed Nov. 7, 2000.

BACKGROUND OF THE INVENTION

1. Field of the Invention

The present invention relates to mechanisms for moving targets used at shooting ranges and the like in order to test the skill of the shooter under more life-like conditions. More particularly, the present invention relates to the use of a telephone to selectively actuate targets to more accurately test the abilities of the shooter.

2. State of the Art

In order to maintain proficiency in the use of various types of firearms, it is common for law enforcement officers, military personnel and sportsmen to engage in target practice. In conventional target practice, a target, i.e. an outline of a person, vehicle or animal is held before a bullet trap (or other type of range). The trap receives bullets fired at the target and contains the bullet so that it may be retrieved and recycled. Such traps include total containment systems wherein the bullet is received in a chamber, and less expensive berm traps in which the bullet is received by a bullet deceleration medium, such as sand or small rubber granules.

While target practice at stationary targets improves accuracy in that context, it fails to prepare the shooter for most real life situations. For example, a police officer shooting at a stationary target may obtain a high degree of accuracy in that scenario. However, for most sportsmen, law enforcement officers and military personnel, the situation in which the real target remains stationary is rare. Usually in military or law enforcement contexts, the target will be moving, and in many cases the target may be returning (or instigating) fire.

To ensure that they are properly trained for such real-life conditions, it is important that law enforcement agents, military personnel and hunters have experience firing at targets are not simply stationary. In attempts to provide more realistic training scenarios, numerous systems have been designed which move the target during shooting practice. For example, a computer can be used to selectively turn targets and thereby test the reflexes of the shooter.

One common problem with such embodiments, however, is that the computer controls can rarely adapt to the particular strengths and weaknesses of the shooter. For example, a police officer may have very good reflexes on his or her right side, but may struggle when targets suddenly appear on his or her left side. A conventional computer program will simply run through the shooting drill. A different program must be run to address the reflex disparity.

Thus, there is a need for a system in which a person overseeing the target range can target control turning and movement from a remote location to better customize the target movement to the needs of the shooter.

SUMMARY OF THE INVENTION

Thus, it is an object of the present invention to provide an improved method and apparatus for moving and/or turning targets and otherwise actuating target range devices, such as lights, horns, track runner targets and the like.

It is another object of the present invention to provide such an improved method and apparatus which is easy to use and relatively inexpensive.

The above and other objects of the invention are realized in specific illustrated embodiments of a remote control target system and method of use which includes a target control processor, a remote control unit, and an interface for communicating between the remote control unit and the target control processor.

In accordance with one aspect of the present invention, the remote control unit includes a telephone which is configured to send signals to the target control processor responsive to pressing keys on the telephone.

In accordance with another aspect of the present invention, the remote control unit is formed by a cordless telephone. The handset of the cordless telephone handset is used to transmit signals responsive to pressing the keys on the handset. The handset conveys signals to the base unit, which, in turn, conveys signals to the interface. The interface then forwards the signals to the processor so that the processor turns or moves targets or other target range device in response to the user pressing keys on the cordless telephone.

BRIEF DESCRIPTION OF THE DRAWINGS

The above and other objects, features and advantages of the invention will become apparent from a consideration of the following detailed description presented in connection with the accompanying drawings in which:

FIG. 1 shows a schematic view of a remote target control system made in accordance with the principles of the present invention;

FIG. 2 shows a wiring diagram in accordance with the principles of the present invention.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Referring to FIG. 1, there is shown schematic view of a a remote target control system formed in accordance with the principles of the present invention. The remote target control system includes a cordless telephone 10 with a hand set 14 and a base unit 18. The base unit 18 is connected by a power cord 22 to a conventional power socket 26. The base unit 18 is also connected by a telephone cord to an interface box 30. The interface box 30 in disposed in communication with a controller 34, which is, in turn, disposed in communication with a processor.

The remote target control system is a useful tool. In general, it gives you eight (8) independent channels that are controlled remotely. As shown in FIG. 1, the wireless control is gained by using a standard cordless telephone. This gives the user many choices. It also makes finding replacements extremely easy and prevents the user from being tied to proprietary remote controls which can be expensive to purchase.

The remote target control system has (3) modes to work in, Manual, Time Full Seconds, Timed Tenth of a Second. The Manual mode gives the ability to turn channels ON and OFF by a press of a key. The two Times modes offer the ability to input a time in seconds. Then turn on pre-selected channels for that given time. These modes are explained in greater detail below.

Setting up the Remote Target Control system

The remote target control system main board 42 has a 12 volt DC in 46, phone in 50, and 8 channel outputs 54. The 12 volt DC in 46 is located on the left side of the board. A black temrinal strip is used to connect the 12 volts. A RED wire is for +12 volts DC. The BLACK wire is for NEGATIVE.

The phone jack connector 50a is located on the bottom side of the board. This works much like a wall phone jack in a home. Simply, plug one end into the controller board 44 and the other end into the cordless telephone 10.

The telephone 10 also requires 120 voltes AC which is provided by the power chord 22 and outlet 26. The telephone base unit 10 and the interface 30 can be 100–150 feet apart.

The eight outputs 54 located on top of the main board 42 in FIG. 2 are 12 volt DC outputs. These can run target valves, and many other electrical devices.

User Modes

There are three (3) modes offered by the remote target control system of the present invention. Any mode can be switched to from any other mode. Simply, type in the command to change to that mode. The lights on the board turn on when the corresponding channel is activated.

Manual Mode

Upon power up, the remote target control system enters this mode with all channels activated. Keys 1–8 toggle the corresponding channel, either ON or OFF. The # key will toggle all selected channels ON or OFF.

The following is a list of commands used in this mode.

Command Function:
1 toggles channel one (ON/OFF)
2 toggles channel two (ON/OFF)
3 toggles channel three (ON/OFF)
4 toggles channel four (ON/OFF)
5 toggles channel five (ON/OFF)
6 toggles channel six (ON/OFF)
7 toggles channel seven (ON/OFF)
8 toggles channel eight (ON/OFF0
toggles all selected channels (ON/OFF)
*OM enters Manual Mode
*06 enters Manual Mode When a channel is turned on it becomes selected. When the # key is pressed, it toggles all selected channels OFF. The channels that were selected stay selected even though they are OFF. So, when the # key is pressed the second time, the selected channel(s) turn back ON. When no channels are activated (ON) and a number is pressed, that channel is now the only one selected. When you change to other modes, the selected channels are remembered, even though the channels may not have been activated (ON).

Timed, Full Second Mode

To enter this mode type *01. The default time is set to 1 second. To change this time press *(new time)*. Example: *5* would set the new time to 5 seconds. To execute this time, press the # key. The selected channels will turn ON for the set time, then turn OFF.

The following is a list of commands used in this mode.

| Command | Function | Example |
|---|---|---|
| * (new time) * | set new time | *15* (sets the new time to 15 seconds) |
| # | execute set time | |
| *01 | enters Timed, Full Second Mode | |

When a time has been executed, a new time can still be entered and executed over top of the previous time. This can be helpful when a long time was accidently executed. Say, 50 seconds was entered. This could be stopped sooner by entering a new time.

Timed, Tenth of a Second Mode

To enter this mode, type *08 or *0T. The default time is set to 0.1 second. To change this time, press *(new time)*. Example: *25* would set the new time to 2.5 seconds. To execute this time, press the # key. The selected channels will turn ON for the set time, then turn OFF.

The following is a list of commands used in this mode.

| Command | Function | Example |
|---|---|---|
| * (new time) * | set new time | *55* (sets the new time to 5.5 seconds) |
| # | execute set time | |
| *0T | enters Timed, Tenth of a Second Mode | |
| *08 | enters Timed, Tenth of a Second Mode | |

When a time has been executed, a new time can still be entered and executed over top of the previous time. This can be helpful when a long time was accidently executed. Say, 22.5 seconds was entered. This could be stopped sooner by entering a new time.

CORDLESS ULTRA INTERFACE

Cordless Ultra Interface

The cordless interface 30 provides an easy way to talk to the range computer. By sending a signal to the input channels of the Modula, a cordless telephone can give commands to the computer. If installing this yourself, refer to the cordless interface install notes. This only covers operation of the cordless interface, it does not talk about installing it.

Message Flow

It is helpful to understand the flow of the message sent to the computer. When a key is pressed on the handset 14, the signal goes to the base unit 18. This is then sent to the cordless interface 30. The interface 30 sends a signal to the controller 34 and the controller sends it to the processor 38. This signal shows up on the computer as a Target Hit on the corresponding channel. Typically, the following phone keypad numbers correspond with these channels.

| Phone Keypad | Ultra Channel |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | 10 |
| * | 11 |
| # | 12 |

Example Program

What the computer 38 does when a key is pressed is all up to the ultra program. This is the program running on the computer. Usually, this program is set to loop, this way it always watches the channel hit inputs. The following is a sample program of one way this can work.

Phone.ult (Entry Program this One Loops)
1. if hit1>0 t=1: run Turn.ult
2. if hit2>0 t=2: run Turn.ult
3. if hit3>0 t=3: run Turn.ult
4. if hit4>0 t=4: run Turn.ult
5. if hit5>0 t=5: run Turn.ult
6. if hit6>0 t=6: run Turn.ult
7. if hit7>0 t=7: run Turn.ult
8. if hit8>0 t=8: run Turn.ult
9. if hit9>0 t=9: run Turn.ult
10. if hit10>0 t=10: run Turn.ult
11. if hit 11>0 run AllOn.ult
12. if hit12>0 run AllOff.ult
13. update
14. go to 1

Turn.ult (this Turns the Targets for the Time that t is Set for)
1. out1..maxout=on
2. wait t
3. out1..maxout=off
4. run Phone.ult AllOn.ult (this Program When Run Turns all the Targets on and Leaves them on)
1. out1..maxout-on
2. run Phone.ult AllOff.ult (this Turns all Targets off)
1. out1..maxout=off
2. run Phone.ult These four programs work together and give full wireless turning control. The run command is used to run other programs. It is important to use the run command because it resets the hit count for all targets.

In light of the above-description, those skilled in the art will appreciate that the present invention provide a significant advantage over prior art systems by eliminating cables from the shooting range firing area. Additionally, the person operating the range is given greater mobility.

Thus there is disclosed an improved remote target control system. Those skilled in the art will appreciate numerous modifications which can be made without departing from the scope and spirit of the present invention. The appended claims are intended to cover such modifications.

What is claimed is:

1. A remote target control system comprising:
    a telephone,
    an interface disposed in communication with the telephone, and
    a computer disposed in communication with the interface and at least one shooting target for selectively actuating a shooting target in response to signals received from the telephone.

2. The remote target control system according to claim 1, wherein the telephone comprises a cordless handset and a base unit.

3. The remote target control system according to claim 1, further comprising a controller disposed in communication with the computer and the interface for actuating at least one target.

4. The remote control target system according to claim 1, wherein the interface communicates with the controller, and wherein the controller communicates with the computer.

5. The remote control target system according to claim 1, wherein the computer runs a predetermined program for actuating computers, and wherein the telephone is usable to override the predetermined program.

6. A remote target control system comprising:
    a cordless telephone and
    a shooting target range device disposed in communication with the cordless telephone and responsive to signals generated by use of the cordless telephone to selectively actuate targets.

7. The remote control system according to claim 1, further comprising an interface disposed in communication with the cordless telephone and the target range device.

8. The remote control system according to claim 7, further comprising a controller disposed in communication with the interface and configured to send signals for actuating targets.

9. The remote control system according to claim 7, further comprising a computer disposed in communication with the interface.

10. The remote control system according to claim 7, wherein the computer is programmed to run programs for actuating targets, and wherein signals from the telephone override the computer.

11. A remote target control system comprising:
    a telephone;
    a controller disposed in communication with the telephone; and
    a plurality of shooting target range devices disposed in communication with the controller and responsive to signals conveyed by the controller.

12. The remote target control system of claim 11, wherein the telephone comprises a cordless telephone.

13. The remote target control system according to claim 11, wherein the controller comprises a touch tone decoder.

14. The remote target control system according to claim 11, wherein the interface comprises an analog circuit.

15. The remote target control system according to claim 12, further comprising a computer disposed in communication with the controller.

16. The remote target control system according to claim 12, further comprising an interface disposed between the telephone and the controller.

17. A method for actuating a bullet target, the method comprising;
    pressing a key on a telephone to develop a signal;
    conveying the signal to a controller; and
    actuating a target responsive to the signal received by the controller.

18. The method according to claim 17, wherein the method further comprises passing the signal through an interface.

19. The method according to claim 17, wherein the method comprises conveying the signal to a computer.

20. The method according to claim 19, wherein the computer runs a target control program and wherein the signal overrides the target control program.

21. The method according to claim 17, wherein the telephone is a cordless telephone.

22. The method according to claim 17, wherein the controller has a plurality of lines disposed in communication with a plurality of targets and wherein the controller sends a signal over a specific line responsive to the signal generated by the telephone.

* * * * *

UNITED STATES PATENT AND TRADEMARK OFFICE
CERTIFICATE OF CORRECTION

PATENT NO. : 6,975,859 B1  
APPLICATION NO. : 10/045434  
DATED : December 13, 2005  
INVENTOR(S) : Spencer Lambert and Addison Sovine Page 1 of 1

It is certified that error appears in the above-identified patent and that said Letters Patent is hereby corrected as shown below:

Column 3, Line 6 reads "... the controller board 44"; should read -- ... the controller board 42 --

In the Claims:
Column 6, Line 9 reads "... according to Claim 1, further"; should read -- ... according to Claim 6, further --

Signed and Sealed this

Seventeenth Day of February, 2009

JOHN DOLL
*Acting Director of the United States Patent and Trademark Office*